US009191413B2

(12) United States Patent
Obaidi (10) Patent No.: US 9,191,413 B2
(45) Date of Patent: Nov. 17, 2015

(54) SYNCHRONIZING VIDEO AND AUDIO OVER HETEROGENEOUS TRANSPORTS (71) Applicant: T-Mobile USA, Inc, Bellevue, WA (US)

(72) Inventor: Ahmad Arash Obaidi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 353 days.

(21) Appl. No.: 13/660,823

(22) Filed: Oct. 25, 2012

(65) Prior Publication Data

US 2013/0106980 A1 May 2, 2013

Related U.S. Application Data

(60) Provisional application No. 61/554,446, filed on Nov. 1, 2011.

(51) Int. Cl.
*H04N 7/14* (2006.01)
*H04L 29/06* (2006.01)
*H04W 76/02* (2009.01)
*H04N 21/43* (2011.01)
*H04N 21/61* (2011.01)

(52) U.S. Cl.
CPC ............ *H04L 65/10* (2013.01); *H04L 65/1069* (2013.01); *H04N 7/148* (2013.01); *H04W 76/025* (2013.01); *H04L 65/80* (2013.01); *H04N 21/4307* (2013.01); *H04N 21/6131* (2013.01); *H04N 21/6181* (2013.01); *H04N 2007/145* (2013.01)

(58) Field of Classification Search
CPC .................... H04N 2007/145; H04N 21/4307; H04N 21/6131; H04N 21/6181; H04M 3/56; H04M 2203/50–2203/509; H04W 4/18; H04W 4/185; H04W 28/00–28/26; H04W 40/00–40/38; H04W 56/00–56/0095; H04W 76/00–76/068; H04W 80/06; H04W 76/25; H04L 65/10; H04L 65/1069; H04L 65/80
USPC .................... 348/14.01–14.16; 370/229–271, 370/351–357; 709/201–207, 217–248
See application file for complete search history.

(56) References Cited

U.S. PATENT DOCUMENTS

| | | | | |
|---|---|---|---|---|
| 6,026,080 | A * | 2/2000 | Roy | 370/260 |
| 6,262,776 | B1 * | 7/2001 | Griffits | 348/512 |
| 6,850,284 | B2 * | 2/2005 | Gries et al. | 348/512 |
| 7,099,288 | B1 * | 8/2006 | Parker et al. | 370/259 |
| 7,120,162 | B1 * | 10/2006 | Katibian et al. | 370/464 |

(Continued)

OTHER PUBLICATIONS

PCT Search Report and Written Opinion mailed Jan. 10, 2013 for PCT Application No. PCT/US12/62259, 9 pages.

*Primary Examiner* — Hemant Patel
(74) *Attorney, Agent, or Firm* — Lee & Hayes, PLLC (57) ABSTRACT

Techniques to synchronize video data and audio data of a video-call over heterogeneous communications transports are disclosed. A transmitting client device adds synchronization indicia for a first communications transport to the video data and synchronization indicia for a second communications transport to the audio data. A receiving client device receives the video and audio data in a buffer, synchronizes the video and audio data, and removes the synchronization indicia for both the video and audio data with a filter. Disclosed techniques to optimize the synchronization include selectively dropping video frames in order to reduce delay, to reduce memory footprint, or to meet quality of service levels as set by a user.

15 Claims, 5 Drawing Sheets

(56) References Cited

U.S. PATENT DOCUMENTS

| | | | |
|---|---|---|---|
| 7,283,154 B2 * | 10/2007 | Shachar et al. | 348/14.08 |
| 8,296,813 B2 * | 10/2012 | Berkey et al. | 725/96 |
| 8,571,189 B2 * | 10/2013 | Yuan et al. | 379/93.08 |
| 2003/0156342 A1 | 8/2003 | Yap et al. | |
| 2004/0203815 A1 * | 10/2004 | Shoemake et al. | 455/450 |
| 2004/0233845 A1 * | 11/2004 | Jeong et al. | 370/230 |
| 2005/0172232 A1 * | 8/2005 | Wiseman | 715/718 |
| 2006/0092987 A1 | 5/2006 | Jang | |
| 2007/0169156 A1 | 7/2007 | Zeng | |
| 2008/0034104 A1 * | 2/2008 | Kariti et al. | 709/231 |
| 2008/0309748 A1 * | 12/2008 | Franceschini et al. | 348/14.01 |
| 2010/0296525 A1 * | 11/2010 | Mahkonen | 370/516 |
| 2011/0170408 A1 * | 7/2011 | Furbeck et al. | 370/230 |
| 2012/0140018 A1 * | 6/2012 | Pikin et al. | 348/14.02 |

* cited by examiner

SYNCHRONIZING VIDEO AND AUDIO OVER HETEROGENEOUS TRANSPORTS

RELATED PATENT APPLICATIONS

This U.S. patent application claims priority from U.S. Provisional Application No. 61/554,446, filed Nov. 1, 2011, which application is hereby incorporated in its entirety by reference.

BACKGROUND

Video-calls are calls comprising both video data and audio data. Typically the video data is the data of a transmitting user and the audio data is the voice data of the transmitting user. However, video-calls can comprise video of subjects other than the transmitting user, may comprise video of office documents during a video-conference, or may comprise a composite of inputs from multiple video cameras. Similarly, the audio data may comprise audio data other than the voice data of the transmitting user, including music, and supplemental audio effects.

Presently, mobile client devices have come to be increasingly sophisticated. Many smart-phones have multiple video cameras, microphones and relatively large video screens. Mobile tablet computers have similar capabilities with larger video screens. Accordingly, users have come to expect video-call capability.

However, evolving mobile wireless networks were originally designed to carry voice data. In contrast, a video call, in particular the video data portions comprise an amount of data large compared to the capacity of voice networks. Accordingly, the audio data and the video data may be sent over different communications transports.

Correspondingly, the receiving client device will have to combine the video data and the voice data arriving over different communications transports and to synchronize the two. However, since different communications transports have different characteristics and different synchronization techniques. Present synchronization techniques do not provide sufficient quality of experience for users for video-calls over heterogeneous transports.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

The Context of Synchronizing Video and Audio Data

Communications infrastructure, such as that of telephone companies and cellular carriers is capital intensive. To preserve prior capital investments, as much as practical, communications infrastructure is evolved rather that replaced. Accordingly, new features are added onto older infrastructure.

Video-calls are no different. The very first cellular infrastructures only carried voice data and typically used circuit switch transport. Later generations of cellular infrastructure added packet data. Early packet data originally was independent of the voice data. For example, received e-mail operated independently of voice communications, and no synchronization between the two.

However, video-calls comprise video data and audio data synchronized together. In video-calls, the synchronization fidelity is relatively high. Where the video-call comprises a video of the transmitting user, and the audio is the voice of the transmitting user, the receiving user can quickly discern if the video-call is lip-syncing inaccurately. In cases where the video data and the audio data are transmitted over different transports, the inaccuracy may be quite pronounced.

Figure 1:
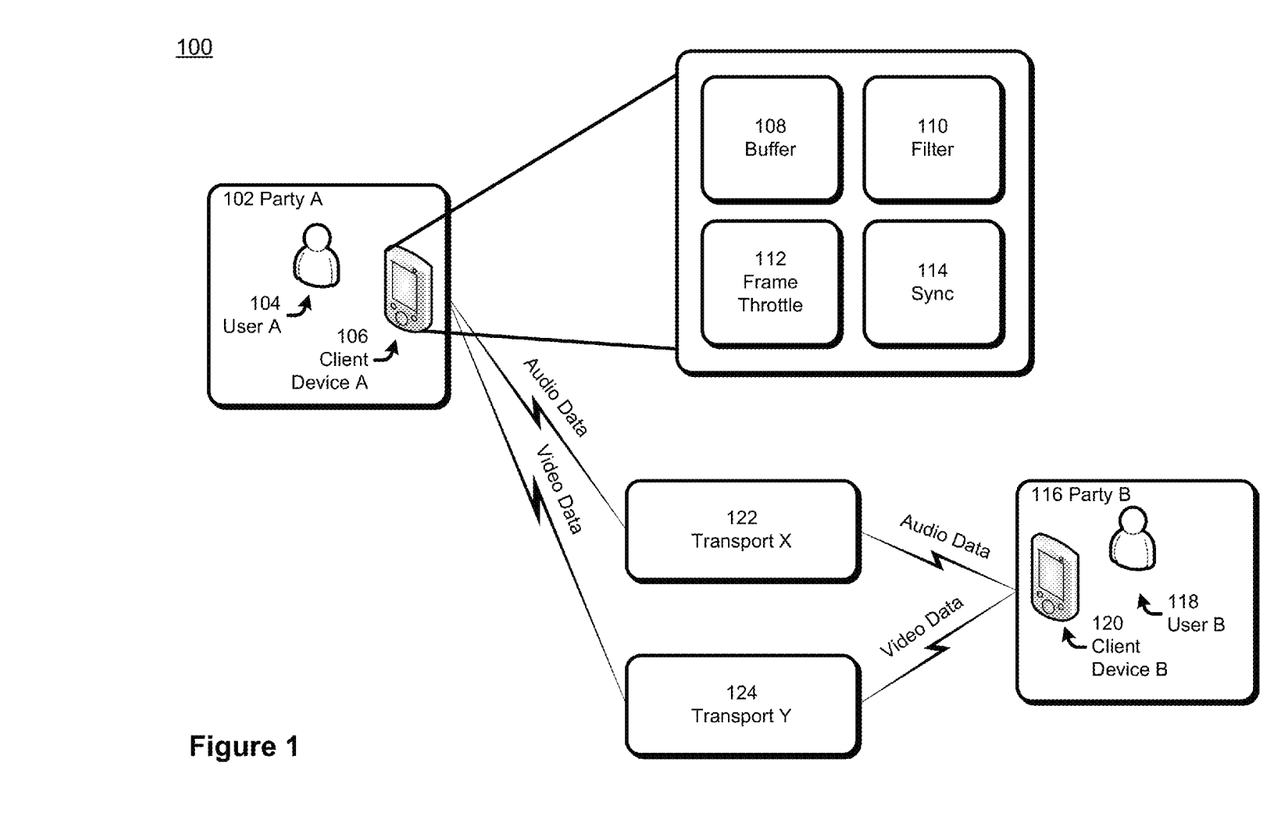
FIG. 1 is a top level diagram illustrating two client devices performing a video-call over heterogeneous communications transports.

FIG. 1 illustrates an exemplary environment 100 where the video data and the audio data components of a video-call are transmitted over heterogeneous transports and synchronized.

The video-call is initiated by party A 102. Party A comprises user A 104 and client device A 106. Client device A 106 may be a smart-phone, tablet computer, a netbook, or any other device with a video-camera, a microphone and a communications interface sufficient to support a video call.

Client device A 106 has hardware and software components to enable the addition of synchronization indicia to video-call data for transmittal, and to synchronize video data and audio data upon receipt. Specifically, client device A 106 may further comprise a memory buffer 108 to receive data to be synchronized, 110 a filter to remove synchronization indicia, a frame throttle 112 to selectively drop video frames, and a video-call synchronization application 114 which coordinates the buffer 108, filter 110 and throttle 112 for received data. For transmitting data, the video-call synchronization application 114 may add synchronization indicia. Client device A 106 supports communications over a plurality of transports.

Party A communicates by video-call with party B 116. Similarly, party B 116 comprises user B 118 and client device B 120. Client device B 120 need not be the same device as client device A 106. Rather, client device B 120 need only be capable of performing a video-call as described with respect to client device A 106. In the event client device B 120 does not support video and audio synchronization over heterogeneous transports, client device B 120 need only be configured to ignore synchronization indicia sent by client device A 106.

Client device A 106 and client device B 120 both support communications over a plurality of transports. In particular, video data may be communicated over a first communications transport, transport X 122, and audio data may be separately communicated over a second communications transport, transport Y 124.

Note that transport X 122 and transport Y 124 are typically different transports with different characteristics. For example transport X 122 which carries audio data may be a circuit switched transport and transport Y 124 which carries video data may be a video switched transport. Alternatively, transport X 122 may be a third-generation ("3G") network and transport Y 124 may be a fourth-generation ("4G") network. By way of another example, transport X 122 may be carried licensed spectrum such as a cellular network and transport Y 124 may be unlicensed spectrum such as Wi-Fi over an arbitrary carrier.

Different transports may transmit data with different priority settings. Different transports may have different Quality of Service ("QoS") and Quality of User Experience ("QoE") levels. These different characteristics will affect the time that the video data and the audio data arrive at party B 116. In one embodiment, the delay between the respective arrivals of the video data and the audio data may be minimized by dynamically altering the priority and QoS/QoE levels of transport X 122 and transport Y 124. Furthermore, the video-call synchronization application 114 may add data that intervening servers may interpret to either increase or decrease prioritization of the transported data.

Exemplary Hardware Platform

Figure 2:
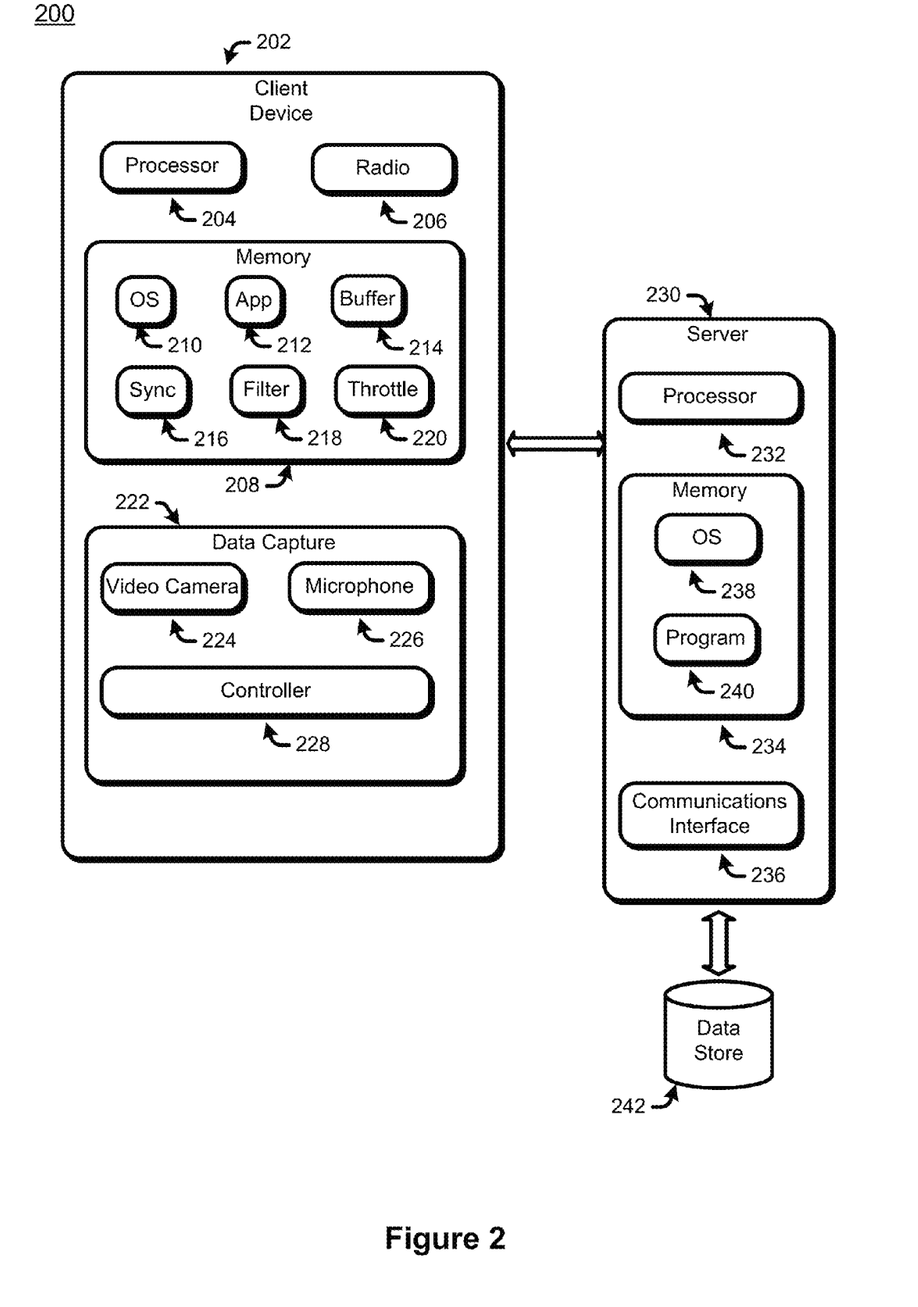
FIG. 2 is a diagram of an example hardware platform for performing video-calls over heterogeneous communications transports.

FIG. 2 illustrates one possible embodiment of a hardware environment 200 for synchronizing video-call data over heterogeneous transports. Specifically FIG. 2 illustrates a client device 202 configured synchronize video data and audio data for a video-call over heterogeneous transports.

Client device 202 is any computing device with a processor 204, a radio 206 that supports at least two transports, and a memory 208. Radio 206 may support unlicensed spectrum communications such as Wi-Fi, or licensed spectrum such as WCDMA and CDMA2000. Alternatively, client device 202 may have multiple radios to support different communications transports.

Client device 202's memory 208 is any computer-readable media which may store several programs including an operating system 210, a video-call application and service 212. In this way, client device 202 has software support for videocalls. Memory 208 also stores software components to support synchronization over heterogeneous transports. Specifically, memory 208 has an input buffer 214 to receive videocall data, a video-call synchronization application 216, a filter 218 to remove synchronization indicia, and a frame throttle 220 to selectively drop video frames.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Client device 202 has a data capture facility 222 to provide hardware support for video-calls. Data capture facility 222 may have a video camera 224 for video input. Alternatively, data capture facility 222 may include a plurality of video cameras. Data capture facility 222 may have a microphone 226 for audio input. All inputs 224, 226 may be dynamically controlled via one or more controllers 228.

Client device 202 may communicate to an intervening server 230. Intervening server 230 is any computing device capable of routing a video-call to another party. Server 230 comprises processor 232, memory 234 and communications interface 236. As per the preceding discussion regarding client 202, memory 234 is any computer-readable media including both computer storage media and communication media.

In particular, memory 234 store programs 238, 240 which may include an operating system 238 and computer-readable instructions 240 to support video-call routing. Video-call routing support 240 may include routines to change priority and QoS/QoE settings, monitor radio conditions and to insert hint data to aid a receiving party to synchronize video-calls. One example of hint data is to determine that there is a spike in interference in the transport, and to direct the receiving party to increase priority to the video data. Alternatively, hint data may be more passive comprising IP packet timing data to be handled by the video-call synchronizing application 216.

Memory 234 may also store programs 240 that may include a database management system. Accordingly, intervening server 230 may include data store 242. Data store 242 may be configured as a relational database, an object-oriented database, a columnar database, or any configuration to support video-call routing data.

Synchronizing Video and Audio Data

Figure 3:
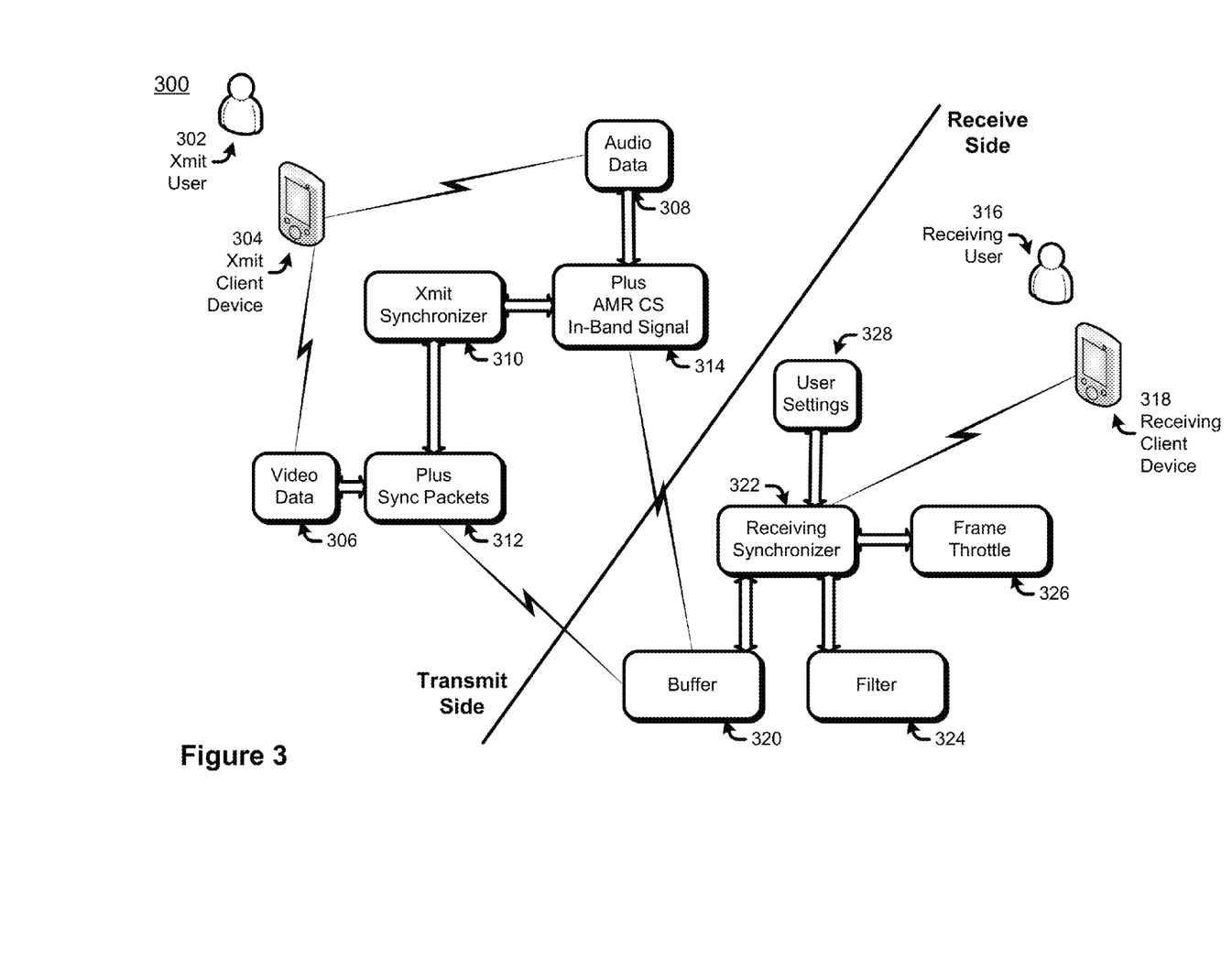
FIG. 3 is a block diagram illustrating an example embodiment of performing synchronization of video data and audio data over heterogeneous communications transports.
Figure 4:
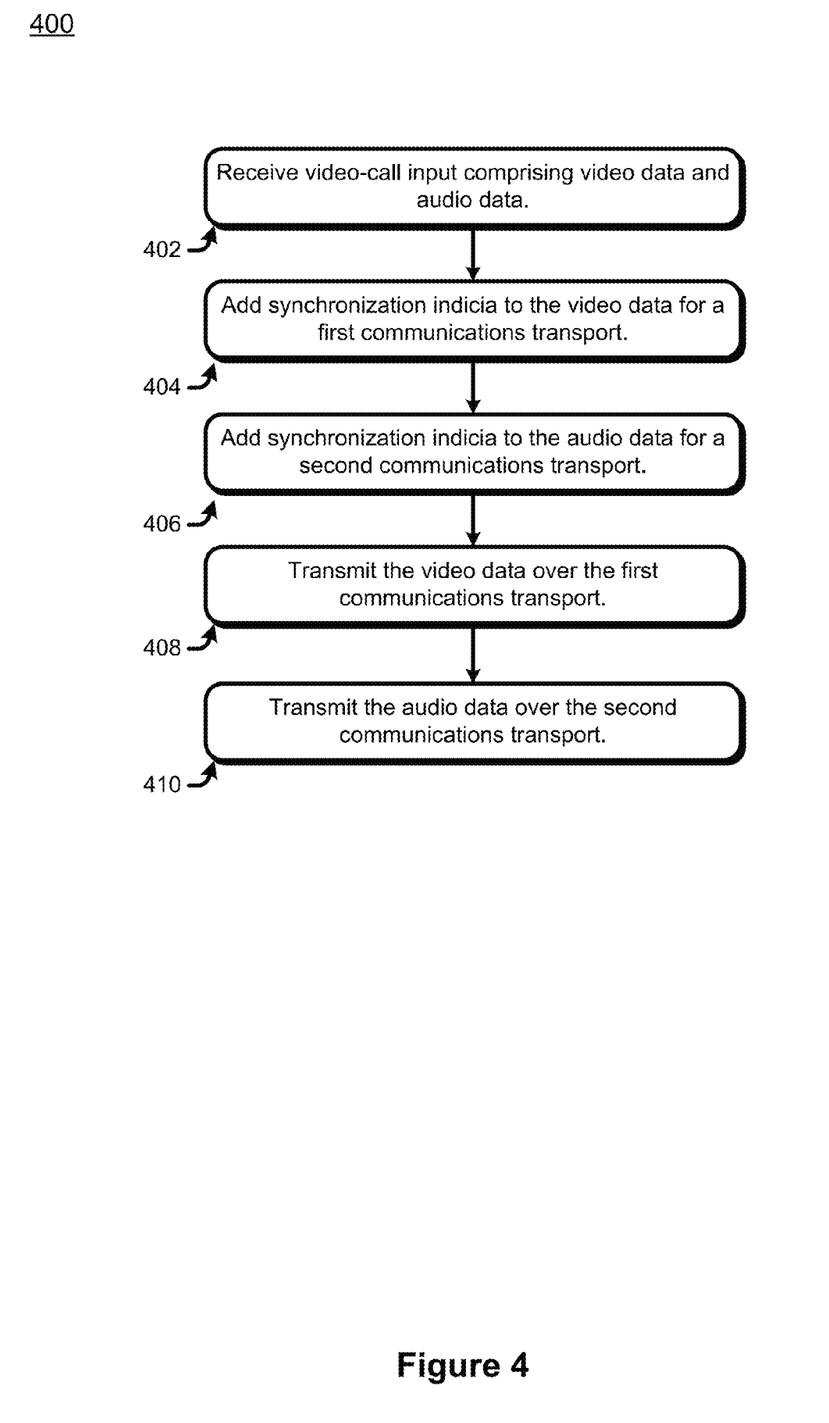
FIG. 4 is a flow chart of an example embodiment to transmit video data and audio data over heterogeneous communications transports such that they may be synchronized.
Figure 5:
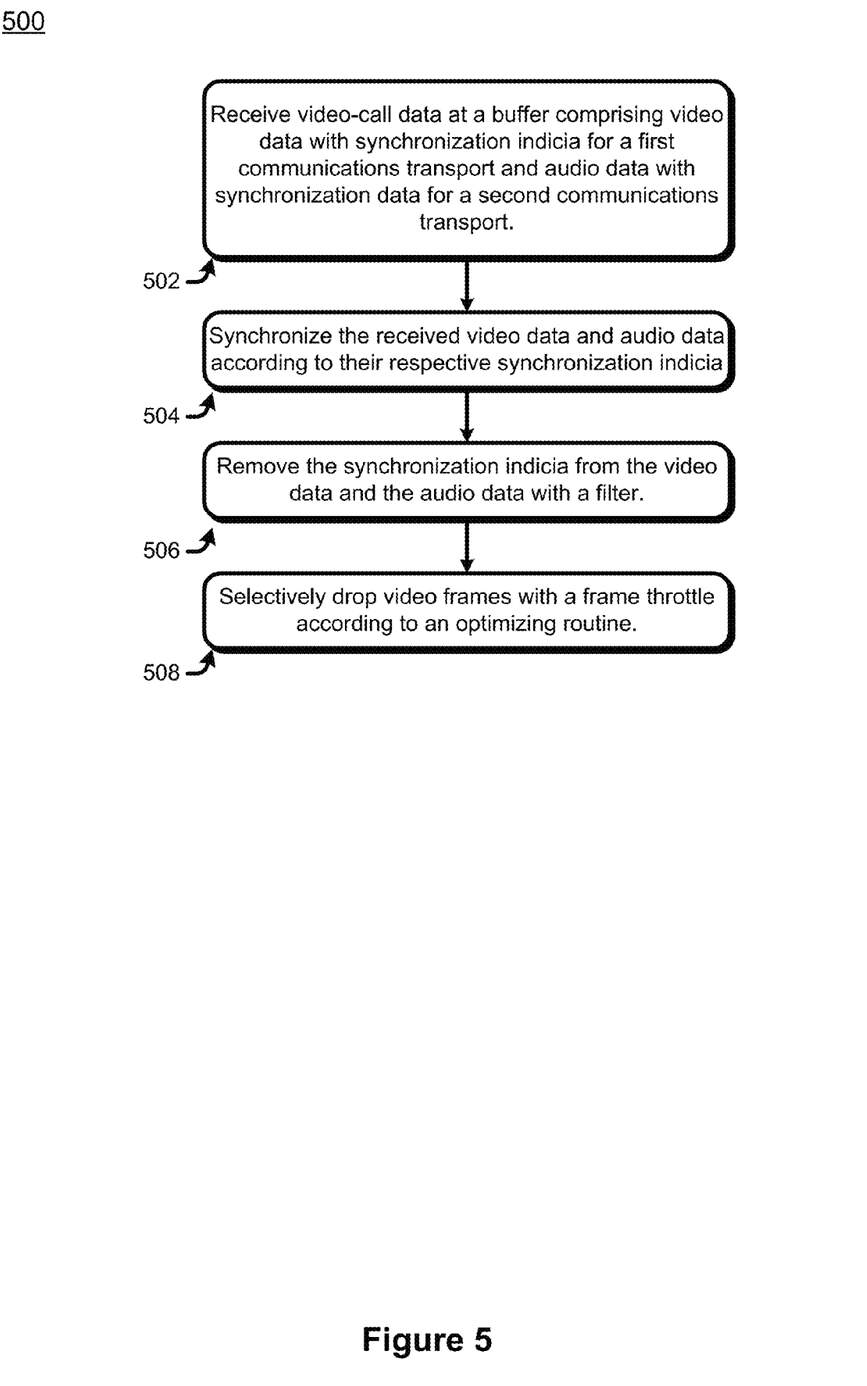
FIG. 5 is a flow chart of an example embodiment to receive and synchronize video data and audio data over heterogeneous communications transports.

Several different techniques to synchronize video and audio data of a video-call over heterogeneous communications transports are disclosed. FIG. 3 is a block diagram 300 illustrating the components in transmitting and receiving video and audio data over heterogeneous transports and synchronizing the video and audio data. FIG. 4 is a flow chart 400 of an example process of transmitting video and audio data with synchronization indicia. FIG. 5 is a flow chart 500 of an example process of receiving and synchronizing the video and audio data.

In FIG. 3, a video-call is initiated by a transmitting user 302. The transmitting user 302 uses a transmitting client device 304 and video client 212 to capture video data 306 and audio data 308. Correspondingly, in FIG. 4, block 402, the transmitting client device 304 receives video-call input comprising the video data 306 and audio data 308. Typically, the video data 306 will be that of the transmitting user 302 and the audio data 308 will be that of the transmitting user 302 speaking. However, the video data 306 may be of some subject the transmitting user 302 happens to be capturing, and the audio data 308 may be of non-voice subject matter such as music.

Once the video data 306 and audio data 308 is capture, in blocks 404 and 406 the transmitting video-call synchronization application 310 adds synchronization indicia 312, 314 is to the video data 306, the audio data 308 or both. The transport for the video data 306 and the transport for the audio data 308 will be different. Thus in block 404, the transmitting videocall synchronization application 310 adds synchronization indicia 312 for a first communications transport to the video data 306 and in block 406 adds synchronization indicia 314 for a first communications transport to the audio data 308.

The form of synchronization indicia 312, 314 depends on the transport used. For example, if the video data 306 is to be transmitted over a packet switched transport, the synchronization indicia 312 for the video data 306 may be additional packets used as synchronization markers 312. By way of another example, if the audio data 308 is to be transmitted over a circuit switched transport, the synchronization indicia 314 for the audio data 308 may be an adaptive multi-rate ("AMR") circuit switched in-band signal. Specifically, the transmitting video-call synchronizing application 310 will insert an AMR signal 314 periodically into the audio data 308 signal which will be used for timing purposes when received.

In blocks 410 and 412, once the synchronization indicia 312, 314 has been added to the video data 306 and the audio data 308 respectively, the video data 306 is transmitted over the first communications protocol and the audio data 308 is transmitted over the second communications protocol.

Upon transmittal, the video data 306 and the audio data 308 may be preferentially routed according to priority settings and QoS/QoE levels. These priority settings and QoS/QoE levels may dynamically change in order to minimize the difference in arrival time of the video data 306 and the audio data 308 by a receiving user 316 and receiving client device 318. Intermediate servers 230 may also introduce hint data into video data 306 and/or the audio data 308. The hint data may be dynamic containing directives to the receiving client device 318 on how to synchronize, or may be static where the hints are radio condition characteristics indicating whether to expect additional delays or not.

Turning to FIG. 5, in block 502, the receiving device 318 receives the video data 306 and the audio data 308 along with their synchronization indicia 312, 314 and potentially intervening server hint data (not shown), in buffer 320. Buffer 320 is generally an allocated block of memory 214 and may be allocated by the receiving video-call synchronizing application 322.

In buffer 214, the receiving video-call synchronizing application 322 will subdivide the video data 306 and the audio data 308 and into sequential segments of data respectively. In the case that either the video data 306 or audio data 308 is packed based, the receiving video-call synchronizing application 322 may also order the packets as necessary.

The receiving video-call synchronizing application 322 will then align the corresponding audio and video segments according to the video and audio synchronization indicia 312, 314, thereby synchronizing the received video data 306 and audio data 308. The receiving video-call synchronizing application 322 may modify its synchronization based on directives received as hint data from an intervening server. Alternatively, the receiving video-call synchronizing application 322 may store the hint data and modify its behavior when transmitting. For example, the receiving video-call synchronizing application 322 may modify the priority or QoS/QoE settings for transmitting either the video data 306 or audio data 308. Alternatively, the receiving video-call synchronizing application 322 may introduce delays to the video data 306 and/or audio data 308 in order to minimize the difference of arrival time of the two.

Upon synchronization, the synchronization indicia 312, 314 are no longer needed. Accordingly, in block 506, the receiving video-call synchronizing application 322 may filter away the synchronization indicia 312, 314 with filter 324. For example, the audio data 308 may use audible pulses for synchronization indicia 314. Since these pulses are not intended for the receiving user 316 to hear, the filter removes the data.

When aligning the video and audio segments, often the video-chat application 212 cannot render both in a synchronized manner because of incomplete data, or either video data 306 or audio data 308 buffering faster or other reasons. For example, it may take an excessive amount of time to align complete video segments to audio segments. Accordingly, in block 508, in order to reduce the delay, the receiving video-chat synchronization application 322 may select video frames to drop using frame throttle 326.

The receiving video-chat synchronization application 322 may ensure acceptable QoS/QoE by not simply dropping video frames, but selecting frames for the frame throttle 326 to drop according to an optimization routine. There are several examples of an optimization routine.

In a first example, if the optimization routine is to reduce processing delay, the routine may balance the amount of frames to drop based on a predetermined QoS/QoE level. The receiving video-chat synchronizing application 322 may measure the processing delay and instruct the frame throttle 326 to drop those selected frames accordingly. Accordingly, the routine may limit frames to drop and may spread out the frames to drop across multiple video and/or audio segments.

The predetermined QoS/QoE level may be set via user settings 328. For example, a user setting may be binary, where a simple on/off checkbox indicates whether frame dropping is allowed or not. In another example, the user may have a slider control of a scale of 1-10 which indicates what percentage of frames may be dropped.

In another example, the optimization routine may balance the size of buffer 320 against QoS/QoE. The receiving video-chat synchronizing application 322 may measure the size of buffer 320 and select frames to be dropped accordingly. Specifically, a lower QoS/QoE will result in the optimization routine instructing the frame throttle 326 to drop more frames, and accordingly the buffer size may be decreased. Alternatively, a higher QoS/QoE will result in the optimization routine instructing the frame throttle 326 to limit the number of frames to be dropped, and accordingly the buffer size may be increased.

Not all frames are equal. Some frames may be dropped preferentially to others. For example, the receiving video-chat synchronizing application 322 may measure the time that frames have been resident in buffer 320. Accordingly, the receiving video-chat synchronizing application 322 may result in the optimization routine instructing the frame throttle 326 drop the frames that have been resident in buffer the longest.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system to electronically communicate a video-call, comprising:
    a processor,
    a memory, communicatively coupled to the processor and storing a video-call synchronization application; and
    a wireless communications device, communicatively coupled to the processor capable of:
        communicating over a first communications transport dedicated exclusively to carry audio data, and a second communications transport dedicated exclusively to carry video data, wherein the first communications transport and the second communications transport carry their respective data with different priority settings or different quality of service levels; and
        dynamically changing one of priority settings or quality of service levels for transmitting on one of the first communications transport or the second communications transport based at least on a difference between the arrival time of the video data and the arrival time of the audio data.

2. The system of claim 1, wherein the first communications transport and the second communications transport comprise a transport over licensed bandwidth and a transport over unlicensed bandwidth.

3. The system of claim 1, wherein the first communications transport and the second communications transport comprise a transport over a circuit switched transport and a packet switched transport.

4. A method to transmit a video-call, comprising:
receiving at a video-call synchronization application on a client device, video-call input comprising video data and audio data;
the synchronization application adding synchronization indicia for a first communications transport to the video data;
the synchronization application adding synchronization indicia for a second communications transport to the audio data;
transmitting the video data and the audio data over the first and second communications transports respectively,
wherein the first communications transport and the second communications transport carry their respective data with different priority settings or different quality of service levels; and
dynamically changing one of priority settings or quality of service levels for transmitting on one of the first communications transport or the second communications transport based at least on a difference between the arrival time of the video data and the arrival time of the audio data.

5. The method of claim 4, wherein the second communications transport is a circuit switched transport, and the synchronization indicia added to the audio data comprises an adaptive multi-rate circuit switched in-band signal.

6. The method of claim 4, wherein the first communications transport is a packet switched transport, and the synchronization indicia added to the audio data comprises synchronization packets.

7. A method to receive a video-call, comprising:
receiving at a buffer video-call data comprising video data with synchronization indicia for a first communications transport and audio data with synchronization indicia for a second communications transport;
synchronizing with a video-call synchronization application, the received video data and audio data according to the synchronization indicia for the video data and the synchronization indicia for the audio data; and
removing with a filter the synchronization indicia for the video data and the synchronization indicia for the audio data,
wherein the first communications transport and the second communications transport carry their respective data with different priority settings or different quality of service levels; and
dynamically changing one of priority settings or quality of service levels for transmitting on one of the first communications transport or the second communications transport based at least on a difference between the arrival time of the video data and the arrival time of the audio data.

8. The method of claim 7, wherein the second communications transport is a circuit switched transport and the synchronization indicia added to the audio data comprises an adaptive multi-rate circuit switched in-band signal.

9. The method of claim 7, wherein the first communications transport is a packet switched transport, and the synchronization indicia added to the audio data comprises synchronization packets.

10. The method of claim 7, wherein the received video data comprises a plurality of video frames and the method further comprising:
selectively dropping video frames from the video data at a frame throttle according to a optimizing routine at the video-call synchronization application.

11. The method of claim 7, wherein the video-call synchronization application measures the delay in synchronizing received video-call data and the optimizing routine selectively drops video frames to reduce delay balanced against maintaining a quality of service level.

12. The method of claim 11, wherein the quality of service level is predetermined by a user setting.

13. The method of claim 11, wherein the video-call synchronization application measures the amount of memory used for the receiving buffer and the optimizing routine selectively drops video frames to reduce the amount of memory used for the receiving buffer balanced against a quality of service level.

14. The method of claim 11, wherein the video-call synchronization application measures the time a least one video frame has been resident in the receiving buffer and the optimizing routine selectively drops at least one video frame that has been resident in the receiving buffer longer than a predetermined time threshold.

15. The method of claim 7, wherein the received video-call data further comprises hint data provided by servers intervening in the video-call; and the video-call synchronization application synchronizes the received video-call data at least in part according to the hint data.

* * * * *